US012638411B2

(12) United States Patent
Schramm

(10) Patent No.: US 12,638,411 B2
(45) Date of Patent: May 26, 2026

(54) SENSOR DEVICE AND METHOD FOR DETECTING PROPERTIES OF A MEDIUM

(71) Applicant: Kyocera AVX Components (Werne) GmbH, Werne (DE)

(72) Inventor: Daniel Schramm, Lünen (DE)

(73) Assignee: Kyocera AVX Components (Werne) GmbH, Werne (DE)

( * ) Notice: Subject to any disclaimer, the term of this patent is extended or adjusted under 35 U.S.C. 154(b) by 259 days.

(21) Appl. No.: 18/123,114

(22) Filed: Mar. 17, 2023

(65) Prior Publication Data

US 2023/0296546 A1      Sep. 21, 2023

(30) Foreign Application Priority Data

Mar. 18, 2022      (DE) .......................... 102022106455.7

(51) Int. Cl.
*G01N 27/22*          (2006.01)
*G01N 27/24*          (2006.01)

(52) U.S. Cl.
CPC ......... *G01N 27/226* (2013.01); *G01N 27/221* (2013.01); *G01N 27/24* (2013.01)

(58) Field of Classification Search
CPC ...... G01N 27/22; G01N 27/24; G01N 27/221; G01N 27/226
See application file for complete search history.

(56) References Cited

U.S. PATENT DOCUMENTS 4,344,293  A  *  8/1982  Fujiwara ............... G01F 23/263
                                                        331/65
10,433,666  B1 * 10/2019  Jovanov ............. B65D 43/0202
2016/0298996  A1   10/2016  Koeroghlian et al.

FOREIGN PATENT DOCUMENTS

JP          2019109242  A  *  7/2019

* cited by examiner

*Primary Examiner* — Eman A Alkafawi
*Assistant Examiner* — Courtney G Mcdonnough
(74) *Attorney, Agent, or Firm* — Dority & Manning, P.A.

(57) ABSTRACT

Aspects relate to a sensor device 1 and a method for detecting properties of a medium having an inner space bounded by a wall. An open measuring capacitor is arranged in the inner space. A coupling capacitor with at least two coupling capacitor areas is arranged on the wall in such a way that at least a part of the wall is arranged between an inner coupling capacitor area and an outer coupling capacitor area. The inner coupling capacitor area is connected to the measuring capacitor 10.

11 Claims, 4 Drawing Sheets

Fig. 2

SENSOR DEVICE AND METHOD FOR DETECTING PROPERTIES OF A MEDIUM

PRIORITY CLAIM

The present application is based on and claims priority to German Application DE102022106455.7, entitled "Sensor Device and Method for Detecting Properties of a Medium," having a filing date of Mar. 18, 2022, which is incorporated by reference herein.

FIELD

Example aspects of the present disclosure relate to a sensor device and a method for detecting properties of a medium.

BACKGROUND

In various technical fields, sensor devices and methods for detecting properties of media are used to analyze the composition of the medium. Of particular interest is the measurement of impurities such as unwanted particles or liquids in the medium. For example, it is known to measure changes in capacitance of a capacitor due to a change in the dielectric properties of the medium caused by impurities. Particularly when measuring media with low viscosity, it is necessary to pay special attention to the sealing of a testing confinement of the sensor device. In this case, sealing problems can occur in the case of wired connections.

U.S. Pat. No. 4,344,293 describes a device which includes a measuring capacitor mounted in a refrigerant channel, wherein the capacitance of the measuring capacitor changes as a function of a change in the dielectric properties of the refrigerant. In this case, the measuring capacitor is connected to electrodes which are inserted into the refrigerant channel through two holes.

SUMMARY

Aspects and advantages of embodiments of the present disclosure will beset forth in part in the following description, or may be learned from the description, or may be learned through practice of the embodiments.

One example aspect of the present disclosure is directed to a sensor device for detecting properties of a medium. The sensor device includes a wall delimiting an inner space. The sensor device includes an open measuring capacitor which is arranged in the inner space. The sensor includes a coupling capacitor with at least two coupling capacitor areas a. In between an inner coupling capacitor and an outer coupling capacitor at least part of the wall is arranged. The inner coupling capacitor area is connected to the measuring capacitor.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 2 is a perspective exploded view of the sensor device of FIG. 1;

DETAILED DESCRIPTION

Figure 1:
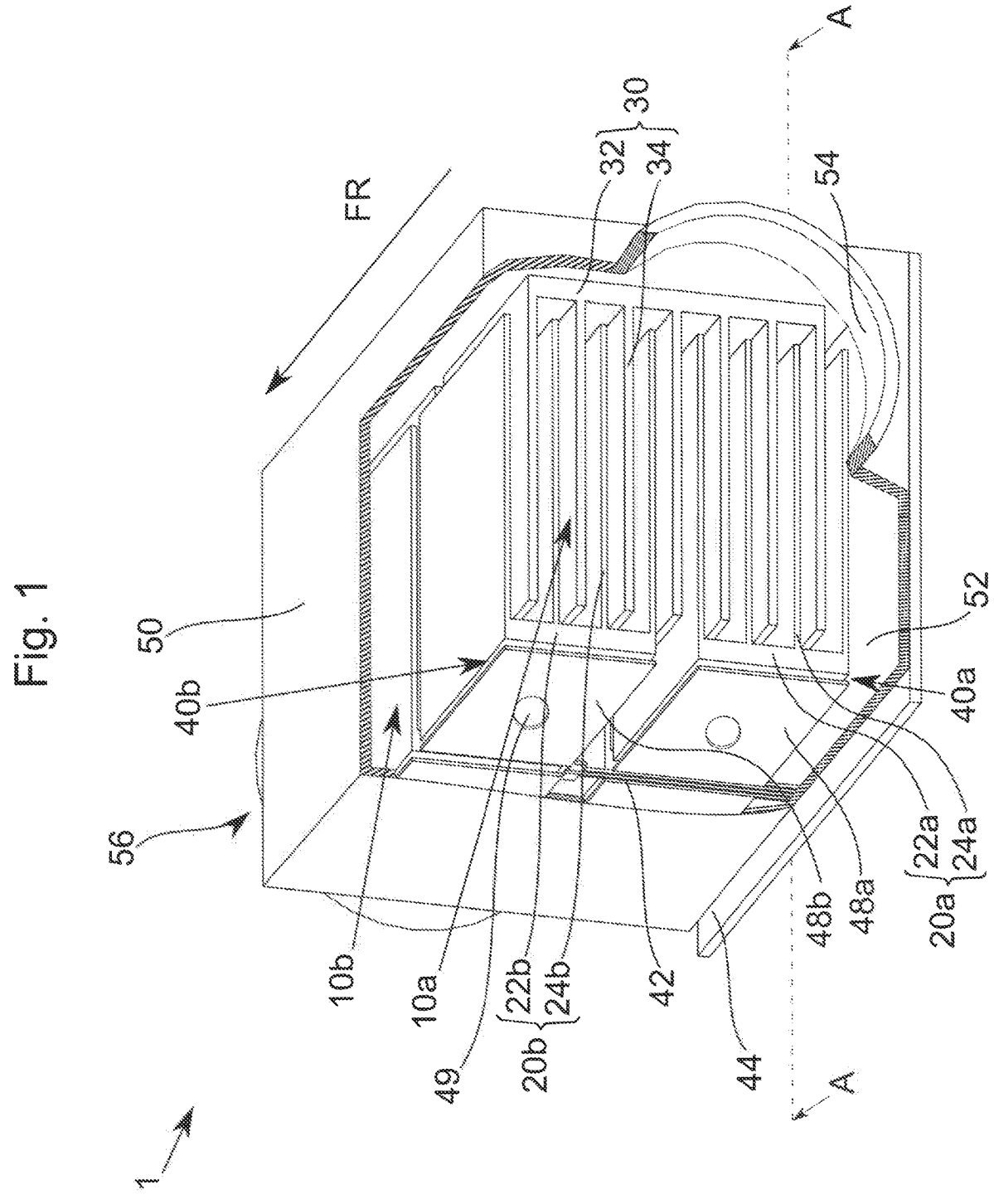
FIG. 1 is a perspective view of a sensor device, with a housing shown partially in cutout.

The sensor device according to examples aspects of the present disclosure for detecting properties of a medium comprises an inner space, a measuring capacitor and at least one coupling capacitor.

According to example aspects of the present disclosure, the inner space is delimited by a wall. By means of the wall, a sealing of the inner space can be ensured. Thus, the medium located in the inner space can thereby be hermetically sealed off by the wall. Depending on the area of application, the wall can form the inner space in the form of a cylinder or cuboid, for example. The wall can, for example, be made of an electrically insulating material such as plastic or ceramic. Particularly, the inner space can be pressure-resistant due to the wall.

The measuring capacitor is arranged in the inner space according to example aspects of the present disclosure. In this case, it may be advantageous to adapt the measuring capacitor to the size of the inner space in order to detect as large a proportion as possible of the medium located in the inner space by the measuring capacitor. The measuring capacitor can be arranged in the inner space in such a way that the measuring capacitor extends over the majority of the cross-section of the inner space. Several measuring capacitors can also be arranged in the inner space.

According to example aspects of the present disclosure, the measuring capacitor is open. This means that the measuring capacitor can have an open connection with the inner space. The measuring capacitor can be formed open in such a way that the medium can penetrate from the inner space into the measuring capacitor and is thus at least partially located in the measuring capacitor. Particularly, the measuring capacitor can be completely filled with the medium. Consequently, the medium can be regarded as a dielectric in the measuring capacitor. The medium can be stationary in the measuring capacitor or flow through the measuring capacitor.

According to example aspects of the present disclosure the coupling capacitor has at least two coupling capacitor areas comprising an inner and an outer coupling capacitor area. The inner capacitor area may be arranged on the wall in the inner space, while the outer coupling capacitor area may be arranged on the side opposite the inner capacitor area, outside the inner space on or inside the wall.

Depending on the geometry of the wall, the coupling capacitor may be adapted to the wall. If the wall is cuboidal in shape, it may be advantageous to arrange planar, congruent outer and inner coupling capacitor areas opposite each other on the wall. In the case of curved walls, such as a cylindrical inner space, the outer coupling capacitor area and the inner coupling capacitor area may be formed curved. Particularly preferably, the coupling capacitor areas can extend over the largest possible areas of the wall in order to make the capacitance of the coupling capacitor as large as possible.

Furthermore, according to example aspects of the present disclosure at least a part of the wall is arranged between the inner coupling capacitor area and the outer coupling capacitor area. Thus, sealing can also be ensured in the area of the coupling capacitor by means of a continuous, uninterrupted wall. Here, it may be advantageous to make the thickness of the wall at the location of the coupling capacitor areas, consequently the distance between the coupling capacitor areas, small in order to keep the capacitance as large as possible and the impedance as small as possible. Particularly, the thickness of the wall may be formed such that the wall at the location of the coupling capacitor is pressure resistant and has sufficient mechanical stability.

According to example aspects of the present disclosure, the inner coupling capacitor area is electrically connected to the measuring capacitor. Here, for example, the measuring capacitor can be connected to the inner coupling capacitor area by a conductor. Thus, the measuring capacitor and the coupling capacitor can form a series circuit.

Furthermore, a second conductor can be connected to the measuring capacitor in order to close the circuit and thus measure the change in capacitance. Here, for example, the second conductor can pass through the wall. Particularly, the second conductor may be connected to a second coupling capacitor to keep the hermetic seal of the wall intact.

Consequently, the capacitance of the measuring capacitor can be measured from outside the inner space. According to example aspects of the present disclosure, at least one coupling from the inner space to the outer coupling capacitor area is wireless.

The sensor device according to example aspects of the present disclosure thus enables both a good sealing of the inner space by the wall and a simple, wireless coupling of the measuring capacitor via the coupling capacitor from the inner space. Within the scope of the present disclosure, properties of the medium can be measured without sealing problems.

Furthermore, example aspects of the present disclosure relate to a method for detecting properties of a medium, in which the medium is located in an inner space bounded by a wall and having an open measuring capacitor, and a capacitance is detected at a coupling capacitor having two coupling capacitor areas, wherein at least a part of the wall is arranged between an inner coupling capacitor area and an outer coupling capacitor area, and the inner coupling capacitor area is connected to the measuring capacitor. The sensed capacitance can allow conclusions to be drawn about properties of the medium. With the aid of the sensor device, even small amounts of impurities in the medium can be measured. In particular, in the case of detection of a liquid in another liquid, such as water in oil, even small amounts of contamination can be measured.

According to an example embodiment of the present disclosure, at least one coupling capacitor area may be at least partially embedded in the wall. By embedding at least one coupling capacitor area, it can be understood that at least one coupling capacitor area is partially located in the wall. Particularly, the coupling capacitor areas can be aligned parallel to the wall in such a way that a large part of the coupling capacitor area is located in the wall. This structure can be achieved by overmolding the coupling capacitor area. In the overmolding process, liquid plastic may be used, for example, to achieve a mechanical connection between the wall and the coupling capacitor area. Consequently, fastening of the coupling capacitor area in the wall as well as stability of the wall can be ensured. Further, reducing the spacing of the coupling capacitor areas may be useful to increase the capacitance of the coupling capacitor.

According to an example embodiment of the present disclosure, at least one coupling capacitor area may be completely embedded in the wall in order to minimize the distance between the coupling capacitor areas. This may be understood to mean that the wall completely encloses the coupling capacitor area. This example embodiment of the present disclosure may also be achieved by overmolding the coupling capacitor area. In terms of this embodiment, the highest capacitance of the coupling capacitor can be achieved.

According to example aspects of the present disclosure, the measuring capacitor may comprise a capacitor comb, wherein the capacitor comb comprises a rear panel and at least two capacitor comb areas attached at an angle to the rear panel and parallel to each other. By forming capacitor comb areas, the area of the measuring capacitor can be increased to further increase the capacitance of the measuring capacitor.

In this regard, the rear panel can be both an electrical and mechanical connection between the capacitor comb areas. The capacitor comb can, for example, be formed in one piece from a bent sheet metal part or a continuous strand casting.

Particularly, the rear panel can have the same length as the capacitor comb areas. By the same length it can be understood here that the dimensions in the area of the contact areas are the same. The capacitor comb areas can be arranged on one or more sides of the rear panel. The capacitor comb areas are attached to the rear panel at an angle and parallel to each other. Particularly, the capacitor comb areas can be arranged at a right angle to the rear panel. This embodiment can also allow a simple, parallel alignment of the capacitor comb areas to each other.

According to example aspects of the present disclosure, the rear panel of the capacitor comb may be the inner coupling capacitor area. In this way, the most compact possible design can be achieved, since additional components are not required.

In example aspects of the present disclosure, the rear panel may be partially embedded in the wall to fix the capacitor comb and/or minimize the distance to the outer coupling capacitor area. Simple fixation may be achieved by overmolding the rear panel into the wall.

According to example aspects of the present disclosure, the measuring capacitor may comprise at least one capacitor comb and at least one counter capacitor comb, wherein the counter capacitor comb engages in the capacitor comb. In this regard, the counter capacitor comb comprises at least two capacitor comb areas and a rear panel. In this context, engagement can be understood as at least partial insertion of the counter capacitor comb into the capacitor comb. Here, each capacitor comb area of the counter capacitor comb may be arranged between two capacitor comb areas of the capacitor comb. Alternatively, each capacitor comb area of the capacitor comb can be placed between two capacitor comb areas of the counter capacitor comb. In terms of this embodiment, the counter capacitor comb areas may have capacitor comb areas that are the same size and/or shape as the capacitor comb. In an embodiment, the capacitor comb may be disposed closer to the wall in the inner space than the counter capacitor comb.

According to example aspects of the present disclosure, two capacitor combs may be engaged with the counter capacitor comb. The counter capacitor comb can thereby couple the two capacitor combs in such a way that a series connection of two partial measuring capacitances is formed.

In this embodiment, the counter capacitor comb has a higher number of capacitor comb areas than each of the capacitor combs.

In example aspects of the present disclosure, the two capacitor combs may be arranged side by side. Thus, signals can be coupled in and out at one side of the inner space.

According to example aspects of the present disclosure, a measuring device may be arranged at an outer side of the wall, wherein the outer coupling capacitor area has an electrical connection to the measuring device. In this case, the wall can have an outer side facing away from the inner space. Here, it may be advantageous to arrange the measuring device directly at the outer side in order to make the sensor device as compact as possible. In the sense of this embodiment, the measuring device may be an electrical circuit. The measuring device can be designed to perform, process and evaluate capacitance measurements of the measuring capacitor and/or the coupling capacitor.

In principle, the outer coupling capacitor area and the measuring device can be connected, for example, by a conductor in any form. According to example embodiments, the outer coupling capacitor area and the connection to the measuring device can be formed in one piece. In this case, the outer coupling capacitor area together with the connection can, for example, be stamped from a piece of sheet metal. Particularly, the integrally formed coupling capacitor area and connection can be at least partially embedded in the wall in order to minimize the distance to the inner coupling capacitor area on the one hand and to ensure protection against external influences on the other hand. In this case, the measuring device can be embedded in the wall by means of overmolding.

According example embodiments of the present disclosure, the measuring device may additionally comprise the outer coupling capacitor area. For example, the measuring device can be formed as an electrical circuit on a circuit carrier, e.g. a circuit board. The coupling capacitor area can then be formed, for example, as a conductor area on the circuit carrier. In this way, the sensor device can be designed to be particularly compact, since components are formed to be multi-functional.

According to example embodiments of the present disclosure, the inner space can have two openings, two measuring capacitors being arranged one behind the other in the direction from the first opening to the second opening. The openings can thereby be arranged particularly on opposite sides in order to ensure a flow of the medium through the inner space. In order for the sensor device to constitute a safety-related system, the measuring capacitors may be redundant. Consequently, two measuring capacitors can be arranged in the inner space in such away that the medium can flow through both measuring capacitors arranged one behind the other in the direction of flow and the signals of the two measuring capacitors can be compared.

According to example embodiments of the present disclosure, at least one coupling capacitor area may have at least one hole. This embodiment can optimize an inflow of a material for overmolding, for example plastic, between the coupling capacitor areas, since, on the one hand, air bubbles can form between the coupling capacitor areas in the course of overmolding and, on the other hand, cooling of the material can take place by the coupling capacitor areas, which causes the material to harden prematurely. This can consequently lead to sealing problems. It can therefore be of particular interest to form several holes in at least one coupling capacitor area, since the material can be optimally distributed through the holes. With the aid of this design, the mechanical strength is also optimized.

FIG. 1 shows an example perspective view of a sensor device 1 with a wall 50 spanning and delimiting an inner space 52, two measuring capacitors 10a, 10b each with two coupling capacitors 40a, 40b, and a measuring device 44.

The inner space 52 is provided for receiving a medium which flows in through a first opening 54 in the wall 50, flows through the inner space 52 and flows out through a second opening 56 in the wall 50. In this case, the first opening 54 and second opening 56 are formed opposite each other in the flow direction FR. The wall 50 is formed from plastic in the shape of a cuboid.

In the inner space 52, two measuring capacitors 10a, 10b, the measuring capacitors 10a, 10b being identical in construction, are arranged one behind the other in the flow direction FR and are formed open towards the inner space 52, so that as far as possible the entire medium flows through the two measuring capacitors 10a, 10b. Both measuring capacitors 10a, 10b each consist of two capacitor combs 20a, 20b, which are coupled by a counter capacitor comb 30. The measuring capacitors 10a, 10b comprise two partial measuring capacitors.

Due to the open design of the measuring capacitors 10a, 10b, the medium in the inner space 52 flows into the interior of the measuring capacitors 10a, 10b and thereby forms the dielectric of the measuring capacitors 10a, 10b. The capacitance values of the measuring capacitors 10a, 10b depend on the properties of the medium, in particular on impurities in the medium. The medium may be oil, for example, which may contain unknown amounts of water in the form of individual droplets as impurities. The sensor device 1 is used to measure any water content. Since the permittivity of oil is considerably lower than the permittivity of water, contamination by water leads to an increase in the capacitance value of the measuring capacitors 10. Likewise, other components in the medium which have dielectric properties differing from the pure medium can lead to a detectable change.

Figure 2:
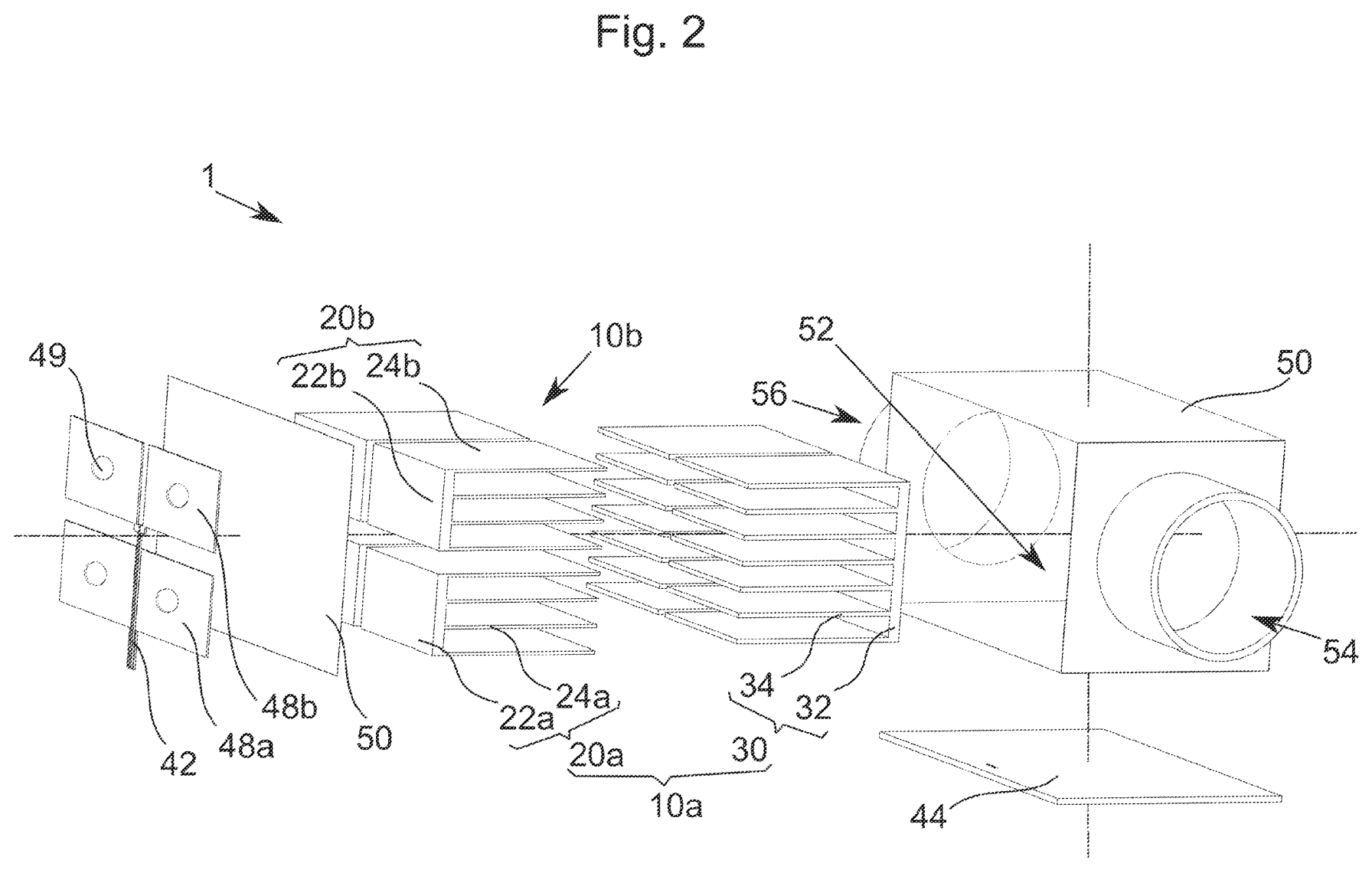

The exploded view in FIG. 2 provides a detailed view of the inner space 52 of the sensor device 1. The capacitor combs 20a, 20b of each measuring capacitor 10a, 10b are arranged side by side on the wall 50. Here, each capacitor comb 20a, 20b has a respective rear panel 22a, 22b and four capacitor comb areas 24a, 24b arranged at a right angle to the rear panel 22a, 22b. The rear panels 22a, 22b of the capacitor combs 20a, 20b are here both a mechanical and an electrical connection between the capacitor comb areas 24a, 24b. The rear panels 22a, 22b and capacitor comb areas 24a, 24b have the same length in the area of the contact areas. The capacitor comb areas 24a, 24b are formed congruently and are arranged parallel and equidistant. The distance between the capacitor comb areas 24a, 24b is selected in such a way that the medium can flow through as unhindered as possible.

Figure 3:
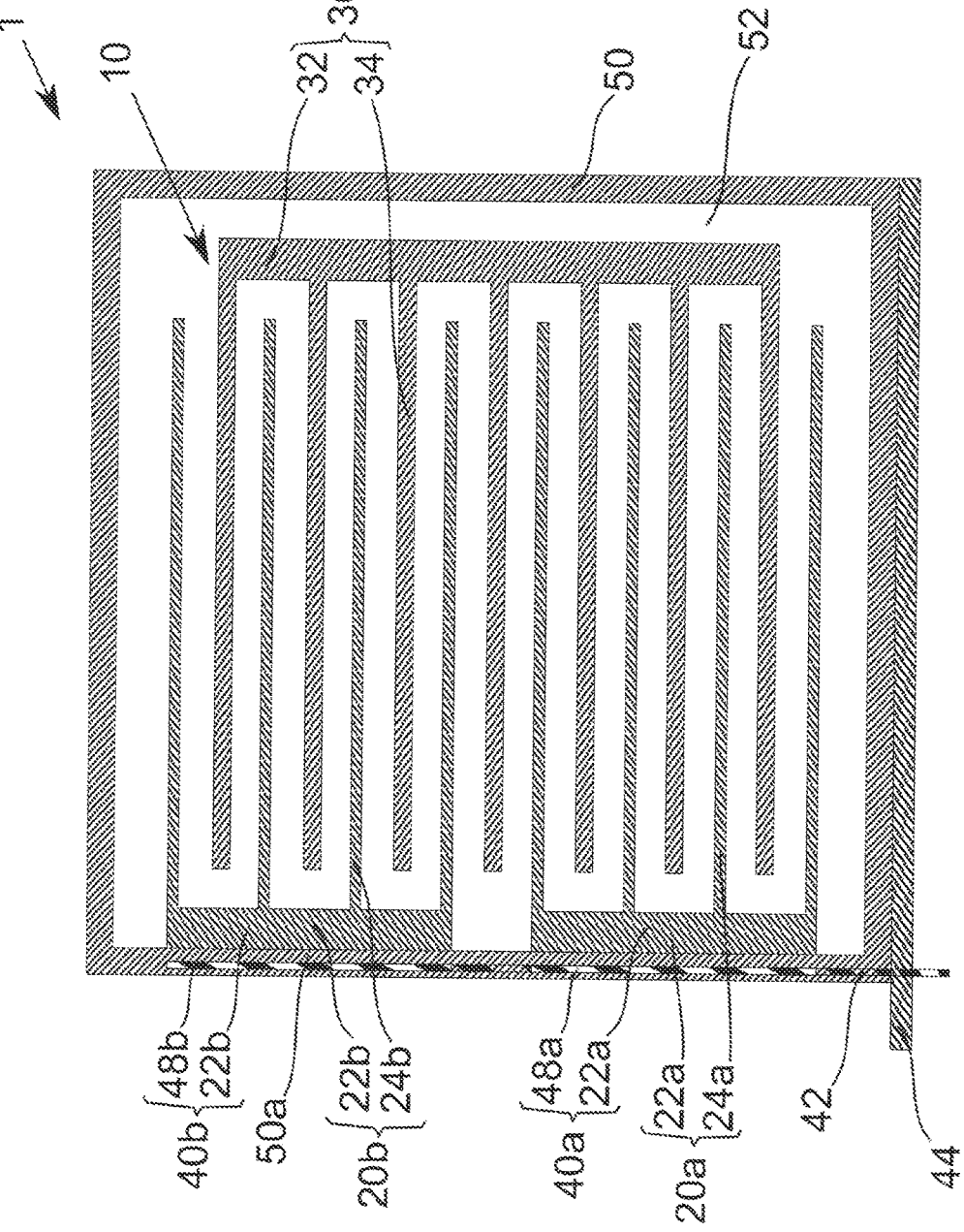
FIG. 3 is a cross-section of the sensor device along a section line A-A according to FIG. 1.

In FIG. 3, the cross-section of the sensor device 1 shows the interior in the assembled state. In engagement with the two capacitor combs 20a, 20b is the counter capacitor comb 30. The counter capacitor comb 30 also has a rear panel 32 and seven capacitor comb areas 34.

In the counter capacitor comb 30, the rear panel 32 is both a mechanical and an electrical connection of the capacitor comb areas 34. Of the seven capacitor comb areas 34, three capacitor comb areas 34 are in engagement with the capacitor comb areas 24a, 24b of the capacitor combs 20a, 20b, respectively. Here, the one partial measuring capacitor comprises the capacitor comb 20a as well as the lower half of the counter capacitor comb 30 and the second partial measuring capacitor comprises the capacitor comb 20b as well as the upper half of the counter capacitor comb 30. The counter capacitor comb 30 is thereby fixed in the inner space 52 (not shown here).

Here, the coupling capacitors 40a, 40b are arranged at the wall 50 in such a way that a continuous part of the wall 50a is arranged between the rear panels 22a, 22b and outer coupling capacitor areas 48a, 48b. The rear panels 22a, 22b and outer coupling capacitor areas 48a, 48b are thereby arranged congruently and oppositely on the wall 50. The outer coupling capacitor areas 48a, 48b are thereby completely inserted into the wall 50 and each have a hole 49 for optimal overmolding (cf. FIG. 1 and FIG. 2). By means of the coupling capacitors 40a, 40b, wireless coupling through the wall 50 is possible. In this case, the tightness of the wall 50 remains intact, since holes for cables, for example, are omitted. Furthermore, the outer coupling capacitor area 48 is formed in one piece with a connection 42, which connects the outer coupling capacitor area 48 with the measuring device 44 (cf. FIG. 2). The measuring device 44 is arranged on an outer side of the wall 50. By outer side is meant here the side of the wall 50 opposite the inner space 52.

Figure 4:
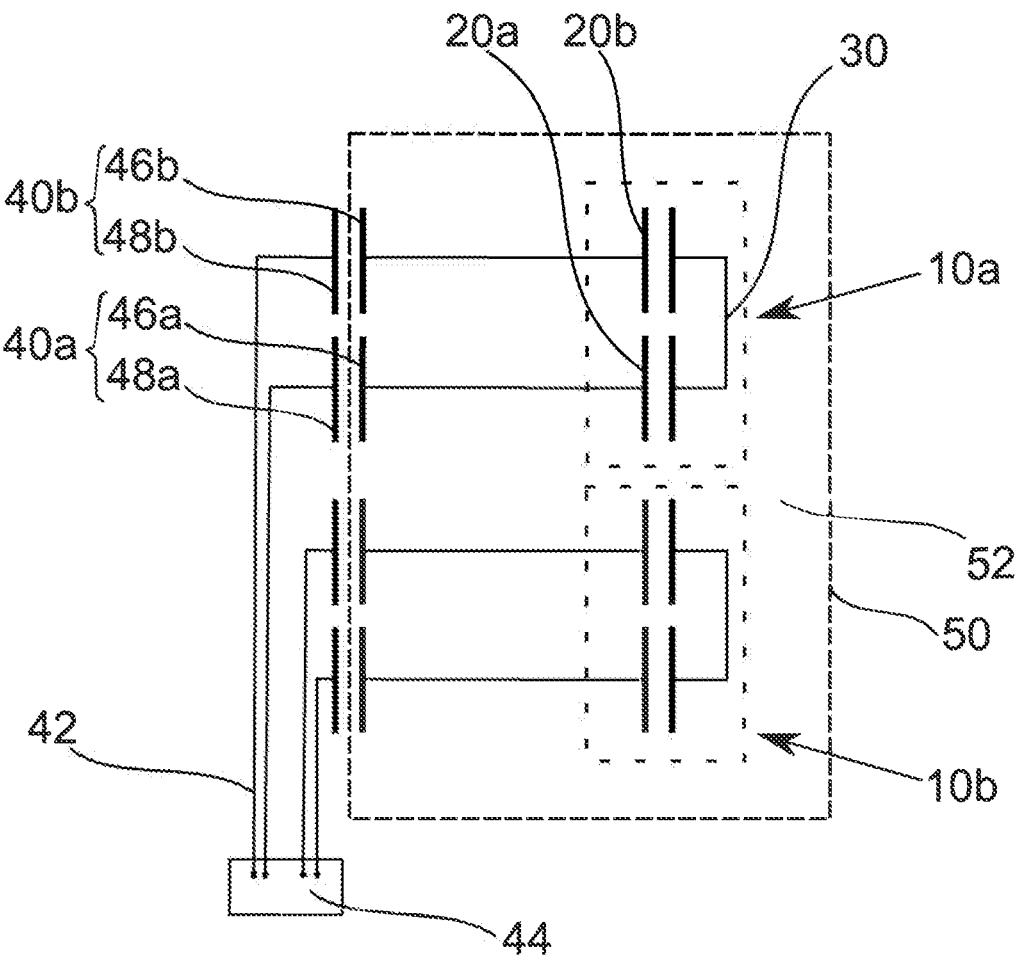
FIG. 4 is a schematic representation of a circuit diagram of the sensor device.

In FIG. 4, a schematic representation of a circuit diagram of the sensor device 1 is shown, in which the electrical structure is basically explained. The coupling capacitors 40a, 40b form a series circuit together with the measuring capacitor 10a, the measuring capacitors 10a, 10b in turn being formed by a series circuit of the partial measuring capacitors. The capacitance of the coupling capacitors 40a, 40b is constant. Since the medium is designed as the dielectric of the measuring capacitors 10a, 10b, the capacitance of the measuring capacitors 10a, 10b changes depending on the dielectric properties of the medium due to impurities. Thus, with the aid of the measuring device 44, the capacitance of the series circuit is measured and an impurity of the medium is determined based on the measured values. The redundant design of the measuring capacitors 10a, 10b enables redundant measurements in order to design a safety-related system.

It should also be noted that the capacitance values of the measuring capacitor 10 are temperature-dependent. Therefore, a temperature sensor (not shown here) is arranged in the inner space 52, the measurement signal of which is also fed to the measuring device 44. The measuring device 44 is designed to correct the measuring signal by a previously calculated or experimentally determined compensation curve depending on the temperature signal.

It should also be noted that the present disclosure is not limited to the described embodiments and variants, but that further embodiments are possible. For example, instead of two measuring capacitors, only one measuring capacitor or a different number of capacitor combs with a different number of capacitor comb areas can be provided. For example, coupling may be provided on opposite sides. In this case, the coupling capacitor areas may be arranged against the wall without being embedded. In general, the features of the embodiments as well as of the claims can be combined as desired.

The invention claimed is:

1. A sensor device for detecting properties of a medium, comprising:
   a wall delimiting an inner space;
   an open measuring capacitor which is arranged in the inner space; and
   a coupling capacitor with at least two coupling capacitor areas, wherein in between an inner coupling capacitor area and an outer coupling capacitor area at least part of the wall is arranged;
   wherein the inner coupling capacitor area is connected to the measuring capacitor,
   wherein the measuring capacitor comprises a capacitor comb configured to accept a flowing medium between teeth of the capacitor comb, wherein the capacitor comb comprises a rear panel and at least two capacitor comb areas which are arranged at an angle to the rear panel and parallel to each other,
   wherein the rear panel of the capacitor comb is the inner coupling capacitor area.

2. The sensor device according to claim 1, wherein at least one coupling capacitor area is at least partially embedded in the wall.

3. The sensor device according to claim 1, wherein at least one coupling capacitor area is entirely embedded in the wall.

4. The sensor device according to claim 1, wherein the rear panel is partially embedded in the wall.

5. The sensor device according to claim 1, wherein the measuring capacitor comprises at least one capacitor comb and at least one counter capacitor comb, the counter capacitor comb engaging with the capacitor comb.

6. The sensor device according to claim 5, wherein two capacitor combs are engaged with the counter capacitor comb.

7. The sensor device according to claim 6, wherein the two capacitor combs are arranged next to each other.

8. The sensor device according to claim 1, wherein a measuring device is arranged at an outer part of the wall, wherein the outer coupling capacitor area comprises an electrical connection to the measuring device.

9. The sensor device according to claim 8, wherein the outer coupling capacitor area and the electrical connection to the measuring device are formed in one piece.

10. The sensor device according to claim 1, wherein the inner space has two openings, two measuring capacitors being arranged one behind the other in a direction from a first opening to a second opening.

11. The sensor device according to claim 1, wherein at least one coupling capacitor area comprises a hole.

* * * * *